June 26, 1962  D. E. BAKER  3,041,176
FARINACEOUS PRODUCTS
Filed July 24, 1959  2 Sheets-Sheet 1
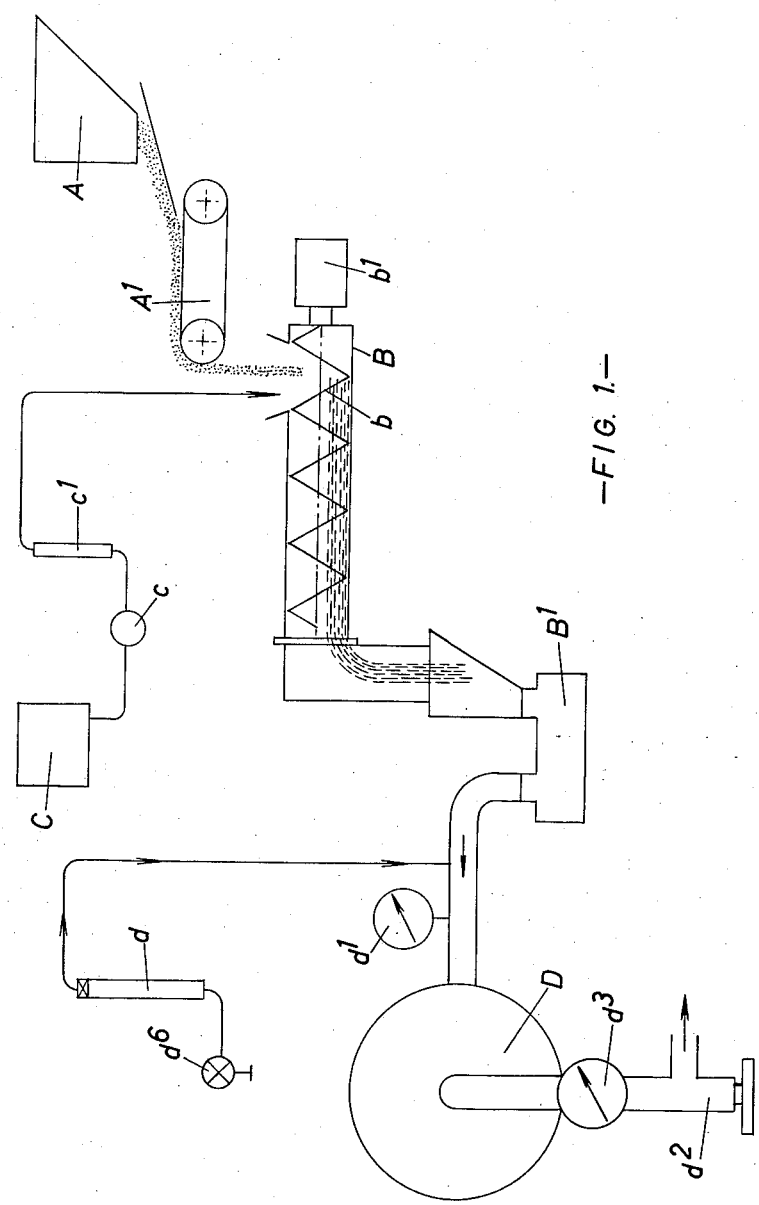
FIG. 1.—
Donald E. Baker
INVENTOR
BY Post & Ross
ATTORNEY June 26, 1962
D. E. BAKER
3,041,176
FARINACEOUS PRODUCTS
Filed July 24, 1959
2 Sheets—Sheet 2
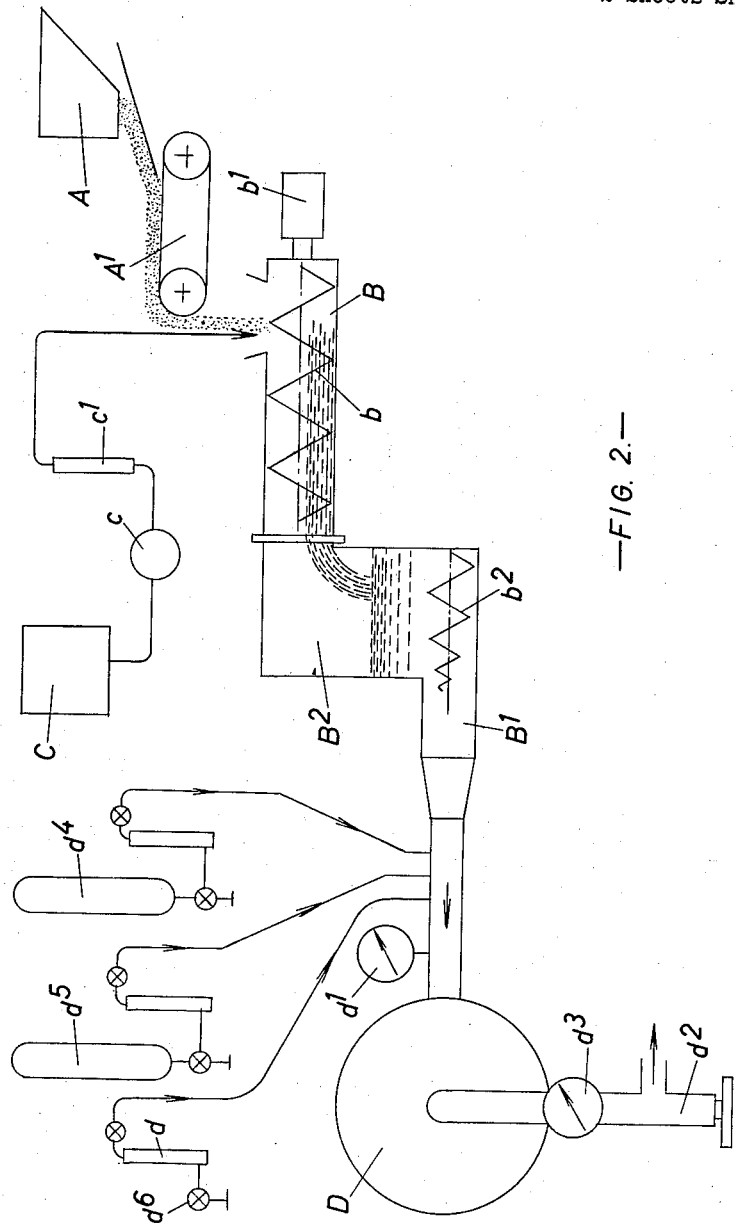
—FIG. 2.—
Donald E. Baker
INVENTOR
BY
ATTORNEY

United States Patent Office 3,041,176
Patented June 26, 1962

3,041,176
FARINACEOUS PRODUCTS
Donald E. Baker, Cheadle Hulme, England, assignor to E. T. Oakes Corporation, Islip, N.Y.
Filed July 24, 1959, Ser. No. 829,248
1 Claim. (Cl. 99—90)

This invention relates to improvements in the production of unfermented risen dough from farinaceous products.

The term "dough" is defined as unfermented risen dough for use in the production of bread or biscuits or other products from a farinaceous material.

The object of the invention is the production of risen dough by a continuous process in which flour is mixed into a slurry and introduced to a continuous mixing machine to which a gaseous medium is injected to aerate the slurry and produce a risen dough.

According to the invention the method comprises the steps of (i) introducing flour and water to a mixing chamber to produce a slurry, (ii) transferring the slurry under pressure to a continuous mixing machine, (iii) introducing a gaseous medium under pressure to the mixing machine and continuing the mixing until a risen dough is produced in which the gaseous medium is distributed throughout the dough, and (iv) automatically feeding the risen dough continuously emerging from the machine to a conveyor or baking tins.

The invention will be described with reference to the accompanying drawings:

FIG. 1 is a diagrammatic view of apparatus for carrying out the invention.

FIG. 2 is a similar diagrammatic view of modified apparatus.

Flour housed in a bin $A$ is fed to a constant weight feeder $A^1$ from which it is transferred to a mixing chamber $B$ to which water is admitted from a temperature controlled tank $C$ through a metering pump $c$ and a flow meter $c^1$.

The flour and water are passed through the mixing chamber $B$ by a worm $b$ or other mixing device having a variable speed drive $b^1$ and emerge therefrom in the form of a slurry which passes to a slurry pump $B^1$ (FIG. 1) or to a holding tank $B^2$ (FIG. 2) from which it is fed by a twin screw $b^2$ to the slurry pump $B^1$.

From the slurry pump $B^1$ the slurry is fed to a continuous automatic mixer $D$ provided with a variable speed drive, for example, the mixer described in E. T. Oakes British Patent No. 646,591. Compressed air controlled at a constant pressure by a valve $d^6$ is metered by a flow meter $d$ into the stream of slurry at a predetermined pressure measured on a pressure gauge $d^1$. The slurry is mixed in the mixer $D$ with the compressed air until a homogeneous risen dough is produced and emerges therefrom in a continuous dough piece through a restriction valve $d^2$ from which it is fed to a conveyor or directly into tins for baking. A thermometer $d^3$ may be provided in the mixer $D$.

By controlling the amounts of the constituents, temperatures and pressures the specific gravity of the dough may be maintained at a predetermined constant value.

Additionally or alternatively, carbon dioxide may be introduced from a bottle $d^4$ and/or oxygen from a bottle $d^5$, the flow being metered as for the compressed air.

The term "gaseous medium" refers to a fluid gaseous at normal temperature and pressure and which may be introduced in a liquid state or in solution.

The following are examples of the mixes supplied to the mixing chamber B.

*Example 1*

28 lbs. European flour (i.e. a weak flour)
8 ozs. of common salt
17 lbs. of water at 100° F.

were pre-mixed in an upright open planetary mixer, the salt being dispersed in the water and the flour added over 5 minutes and mixed for a further 5 minutes to produce a slurry at 87° F.

The slurry was then pumped to the mixing head of an automatic mixer D, the rotor of which was driven at 250 r.p.m. An air pressure of 120 lbs. per square inch gauge was applied, a pressure of 100 lbs. per square inch being maintained in the mixing head, and an air flow meter $d$ reading of 60% on the air flow meter having a maximum scale reading of 1.38 standard cubic feet per minute.

The continuous flow of risen dough issuing from the mixer head D was separated, placed in baking tins and baked for 30 minutes at 450° F.

The resulting 13½ ozs. loaves had a slightly larger volume per unit weight, and a whiter crumb and appearance, than the conventional 14 ozs. loaf, and a uniform and very fine texture. The external appearance was similar to that of a normal loaf and the aerated structure continued into the crust, which was crisp. Time taken from commencing feeding of ingredients to producing baked product 45 minutes.

*Example 2*

A blend of biscuit and baker's flour in the proportion of 2:1 by weight was held in a flour bin A. Situated below the bin A a constant weight feeder $A^1$ supplied the blend at a rate of 10 lbs. per minute to a mixer B. Simultaneously a liquor consisting of water and 3 lbs. salt to each 100 lbs. of water maintained at a temperature of 100° F. was metered to the dough mixer at a rate of 36.5 gallons per hour. The mixer B was run at a speed of 340 r.p.m. From the mixer B the slurry was fed to a pump $B^1$ running at 190 r.p.m. The dough was pumped into an automatic mixing head D at a pressure of 100 lbs. per sqguare inch gauge.

Upstream from the mixing head D air was injected at a constant pressure of 140 lbs. per square inch gauge, the rate of flow of 60% being indicated on the flow meter $d$ having a maximum scale reading of 1.38 standard cubic feet per minute. The rotor of the mixer D revolved at 135 r.p.m. The aerated dough was deposited into baking tins and baked.

Time taken from commencing feeding of ingredients to producing a baked product 36 minutes.

*Example 3*

Untreated baker's flour was blended in equal quantities with the base flour used in the manufacture of self-raising flour but without the additives, and fed at the rate of 14.6 lbs. per minute to the mixer B.

Water at 100° F. was simultaneously metered at a rate of 50 gallons per hour.

The mixer B was run at a speed of 340 r.p.m. the slurry produced being fed into a hopper $B^2$. The base of this hopper incorporates two contra-rotating tapered worm conveyors force feeding the slurry into the pump $B^1$, this being run at 52 r.p.m. which pumped the slurry to a continuous automatic mixing head D running at 250 r.p.m.

A pressure of 150 lbs. per square inch gauge was maintained in the system and risen dough was produced with (a) Carbon dioxide metered into the slurry stream at a presure of 200 lbs. per square inch gauge with a setting of 24% on the flow meter having a maximum scale reading of 4.6 standard cubic feet per minute.

(b) Oxygen was metered into the slurry stream at a pressure of 200 lbs. per square inch with a setting of 24% on the flow meter, having a maximum scale reading of 4.6 standard cubic feet per minute.

(c) Carbon dioxide and oxygen in various proportions to give a total flow of 24% on the flow meter having a maximum scale reading of 4.6 standard cubic feet per minute.

Good textures were produced in all cases, (a) producing a more attractive crust and aroma than (b), whilst (b) had a marked whitening effect on the dough. The preferred arrangement was (c).

Time taken from commencing the feeding of ingredients to producing a baked product 45 minutes.

Example 4

Untreated Winters flour was fed from the bin A by means of a constant weight feeder $A^1$ at a rate of 14.6 lbs. per minute. Water (containing 3 lbs. salt to 100 lbs. water) at 100° F. was metered at 51 gallons per hour. These two streams met at the inlet of a slurry mixer B running at 340 r.p.m. passing into a hopper $B^2$ suitably sized to hold a 10 minute supply of slurry.

The slurry was continuously removed from the hopper by contra-rotating worms to force feed a pump $B^1$ running at 52 r.p.m. which pumped the slurry to a continuous automatic mixing head D running at 250 r.p.m. a pressure of 150 lbs. per square inch being maintained in the system.

The necessary reduction in the apparent specific gravity of the dough was obtained by metering in oxygen, air or carbon dioxide at an indicated rate of 24% on a flow meter having a maximum scale reading of 4.6 standard cubic feet per minute with an inlet pressure at 200 lbs. per square inch gauge.

Time taken from commencing the feeding of ingredients to producing a baked product 46 minutes.

Sorbic acid may be incorporated as a mould inhibitor.

I claim:

A process for continuously rapidly producing an oven-ready, risen dough comprising the steps of mixing predetermined quantities of flour and water in the absence of a leavening agent to produce a slurry, continuously introducing a stream of the slurry under pressure to the inlet of a continuous mixing machine so that the said stream is forced by displacement through said machine, continuously injecting a gaseous medium at a controlled rate and under controlled pressure into the slurry stream, maintaining a controlled substantially constant superatmospheric pressure in said mixing machine, during the passage of the slurry and gaseous medium through the mixing machine working the slurry sufficiently to homogeneously mix it with and retain said gaseous medium during passage through the mixing machine to produce a conditioned dough having the said gaseous medium distributed substantially uniformly therethrough, continuously discharging the said conditioned dough incorporating the said distributed gaseous medium through a restricted flow area into a zone at a pressure lower than that maintained within the mixing machine, and allowing the discharged dough to rise under the action of the resulting expansion of the gaseous medium to provide the oven-ready dough.

References Cited in the file of this patent

UNITED STATES PATENTS

| Re. 1,524 | Fitzgerald | Aug. 18, 1863 |
| 33,432 | Fitzgerald | Oct. 8, 1861 |
| 2,920,964 | Oakes | Jan. 12, 1960 |
| 2,953,460 | Baker | Sept. 20, 1960 |